（12） United States Patent
Foote

(10) Patent No.: US 6,230,565 B1
(45) Date of Patent: May 15, 2001

(54) PRESSURE-COMPENSATED TRANSDUCERS, PRESSURE-COMPENSATED ACCELEROMETERS, FORCE-SENSING METHODS, AND ACCELERATION-SENSING METHODS

(75) Inventor: Steven A. Foote, Issaquah, WA (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/087,208

(22) Filed: May 28, 1998

Related U.S. Application Data

(60) Provisional application No. 60/047,912, filed on May 29, 1997.

(51) Int. Cl.[7] ................................................ G01P 15/10
(52) U.S. Cl. ..................... 73/514.29; 73/497; 73/514.29
(58) Field of Search ........................... 73/514.29, 514.16, 73/514.36, 514.38, 497, 862.637, 862.639, 862.41, 862.59, 862.623, 862.622, 862.621

(56) References Cited

U.S. PATENT DOCUMENTS

| | | | | |
|---|---|---|---|---|
| 4,535,638 | * | 8/1985 | EerNisse et al. | 73/862.59 |
| 4,598,381 | * | 7/1986 | Cucci | 73/766 |
| 4,751,849 | * | 6/1988 | Paros et al. | 73/862.59 |
| 5,005,413 | | 4/1991 | Novack | 73/517 |
| 5,020,370 | * | 6/1991 | Deval et al. | 73/778 |
| 5,060,526 | * | 10/1991 | Barth et al. | 73/862.59 |
| 5,379,639 | | 1/1995 | Hulsing | 73/517 |
| 5,511,427 | * | 4/1996 | Burns | 73/708 |
| 5,546,810 | * | 8/1996 | Arikawa et al. | 73/862.59 |

* cited by examiner

Primary Examiner—Helen Kwok

(57) ABSTRACT

Pressure-compensated transducers and accelerometers, and force-sensing and acceleration-sensing methods are described. In a preferred embodiment, regression techniques are utilized in the context of a vibrating beam force transducer to provide a measure of acceleration which is both temperature-compensated and pressure-compensated.

19 Claims, 3 Drawing Sheets

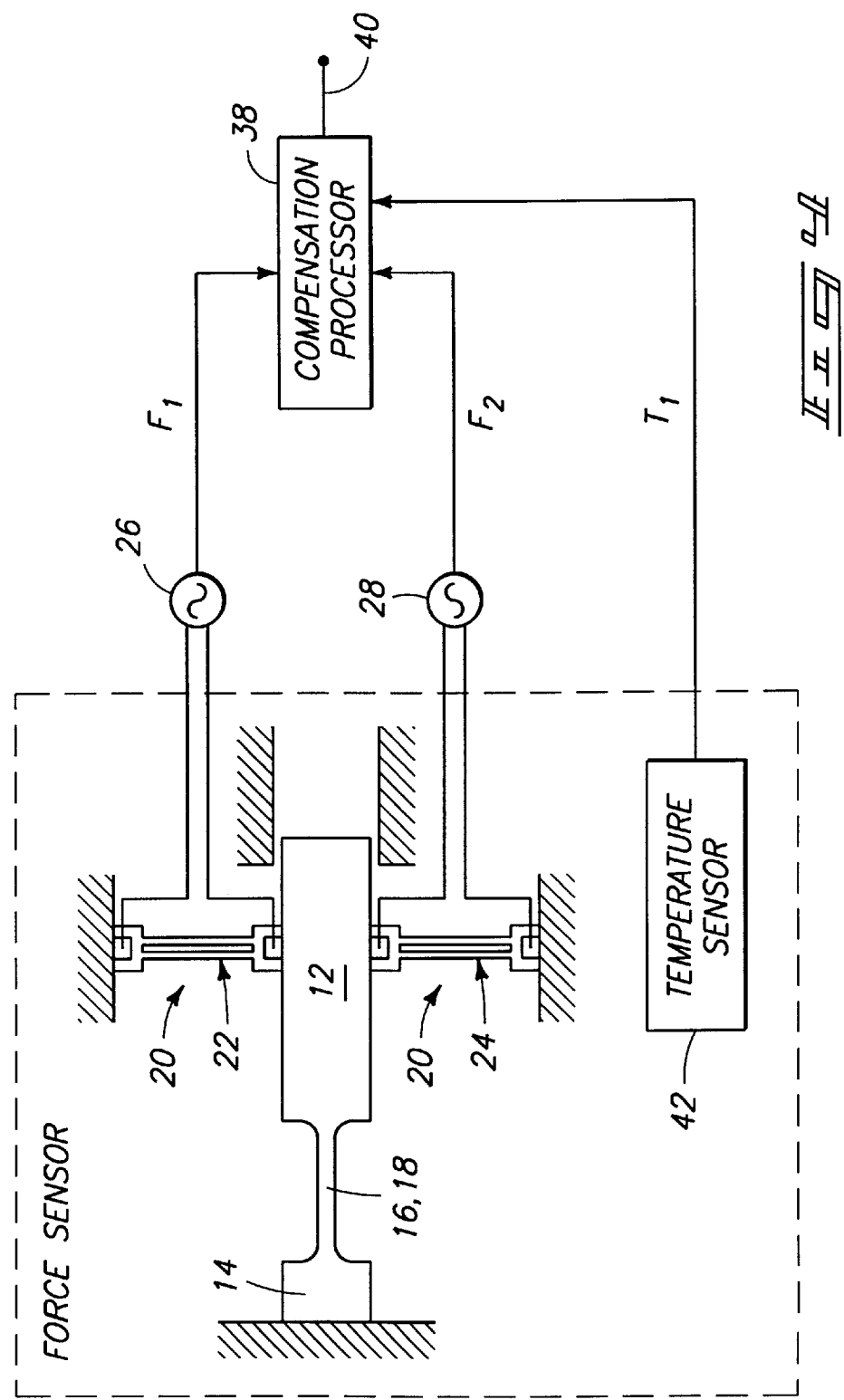

PRESSURE-COMPENSATED TRANSDUCERS, PRESSURE-COMPENSATED ACCELEROMETERS, FORCE-SENSING METHODS, AND ACCELERATION-SENSING METHODS

CROSS-REFERENCE TO RELATED APPLICATION

This application claims priority from U.S. Provisional Application 60/047,912, filed May 29, 1997, and incorporated by reference herein.

TECHNICAL FIELD

The present invention relates generally to pressure-compensated transducers and force-sensing methods, and particularly to pressure-compensated and temperature-compensated accelerometers, and acceleration-sensing methods.

BACKGROUND OF THE INVENTION

Force transducers are often used as force-to-frequency converters in accelerometers and other instruments. One type of force transducer employs a vibratable assembly which can be used to sense acceleration. In one known arrangement, the transducers are used in push-pull pairs in which a given acceleration results in a compression force on one transducer, and a tension force on the other transducer. This mode of operation provides a high degree of compensation for many so-called common mode errors, i.e. errors that cause the frequencies of the transducer to shift by the same amount in the same direction, because the shifts cancel in the algorithms normally used to process the transducer outputs. Such errors include vibration rectification errors, errors induced by temperature change, aging errors, and measurement errors induced by a drift in the clock frequency.

Such force transducers can also be sensitive to density or pressure variations. The density or pressure sensitivity is primarily due to mass loading effects on the beams. Specifically, gas molecules near the beams tend to oscillate with the beams. Such effectively increases the mass of the beams, thereby affecting the frequencies at which the beam vibrates. When the pressure or density of the surrounding gas increases, the effective mass of the beams also increase which lowers the beams' vibration frequencies. Because the beams' vibration frequencies are employed as a measurement of the applied force, e.g. acceleration, the density-induced or pressure-induced variation can cause an unwanted error in the sensed acceleration output. Accordingly, it would be desirable to reduce, if not eliminate this density-induced or pressure-induced error.

Precision force transducers can be packaged in a vacuum to avoid errors resulting from the density-induced variation. However, the choice of internal materials used in precision sensor designs is severely constrained due to out-gassing concerns. Because gas density within the package directly drives density-induced variations, a heavy burden of hermeticity is place on the packaging. The material constraints in hermeticity requirements, in turn, increase the cost and limit performance. Accordingly, it would be desirable to provide an accelerometer with reduced pressure effects and simpler packaging constraints.

This invention arose out of concerns associated with improving forced-sensing transducer and accelerometer operations. In particular, the invention arose out of concerns associated with providing improved vibrating beam force transducers and methods.

SUMMARY OF THE INVENTION

Pressure-compensated transducers, pressure-compensated accelerometers, force-sensing methods, and acceleration-sensing methods are described.

According to one aspect of the invention, a pressure-compensated transducer is provided and includes a movable member and a vibratable assembly coupled with the movable member. The assembly is configured to vibrate at various frequencies responsive to movement of the movable member. The assembly has a frequency output which gives an indication of the various frequencies, with the various frequencies giving an indication of a force acting upon the movable member. A temperature sensor external to the vibratable assembly is configured to measure a temperature proximate the vibratable assembly and provide a temperature output. Preferably, a compensator is provided and includes a frequency input for receiving the frequency output of the vibratable assembly, and a temperature input for receiving the temperature output of the temperature sensor. The compensator is configured to compute, from the frequency output and the temperature output, a more accurate force measurement which compensates for a pressure condition proximate the vibratable assembly.

According to another aspect of the invention, a pressure-compensated accelerometer includes a deflectable proof mass and a vibrating beam assembly coupled with the proof mass. The assembly is configured to develop different vibratory frequencies responsive to an acceleration applied to the proof mass. A temperature sensor is configured to measure a temperature condition proximate the vibrating beam assembly. A compensation processor is operably coupled with the temperature sensor and configured to enable computation of a more accurate, pressure-compensated and temperature-compensated acceleration.

According to another aspect of the invention, a force-sensing method comprises using a pair of measured vibration frequencies and a measured temperature to compute a temperature-compensated, pressure-compensated force experienced by a vibrating beam force sensor.

According to another aspect of the invention, an acceleration-sensing method comprises providing a deflectable proof mass and a vibrating beam assembly coupled with the proof mass, the assembly and proof mass being collectively configured to develop different vibratory frequencies responsive to an acceleration applied to the proof mass. The different vibratory frequencies are determined and a temperature condition proximate the vibrating beam assembly is measured. Using the determined vibratory frequencies and the measured temperature condition, a pressure-compensated acceleration is derived.

BRIEF DESCRIPTION OF THE DRAWINGS

FIG. 4 is a schematic diagram illustrating a force-sensing transducer which is both temperature-compensated and pressure-compensated in accordance with a preferred embodiment of the present invention.

DETAILED DESCRIPTION OF THE PREFERRED EMBODIMENTS

Figure 1:
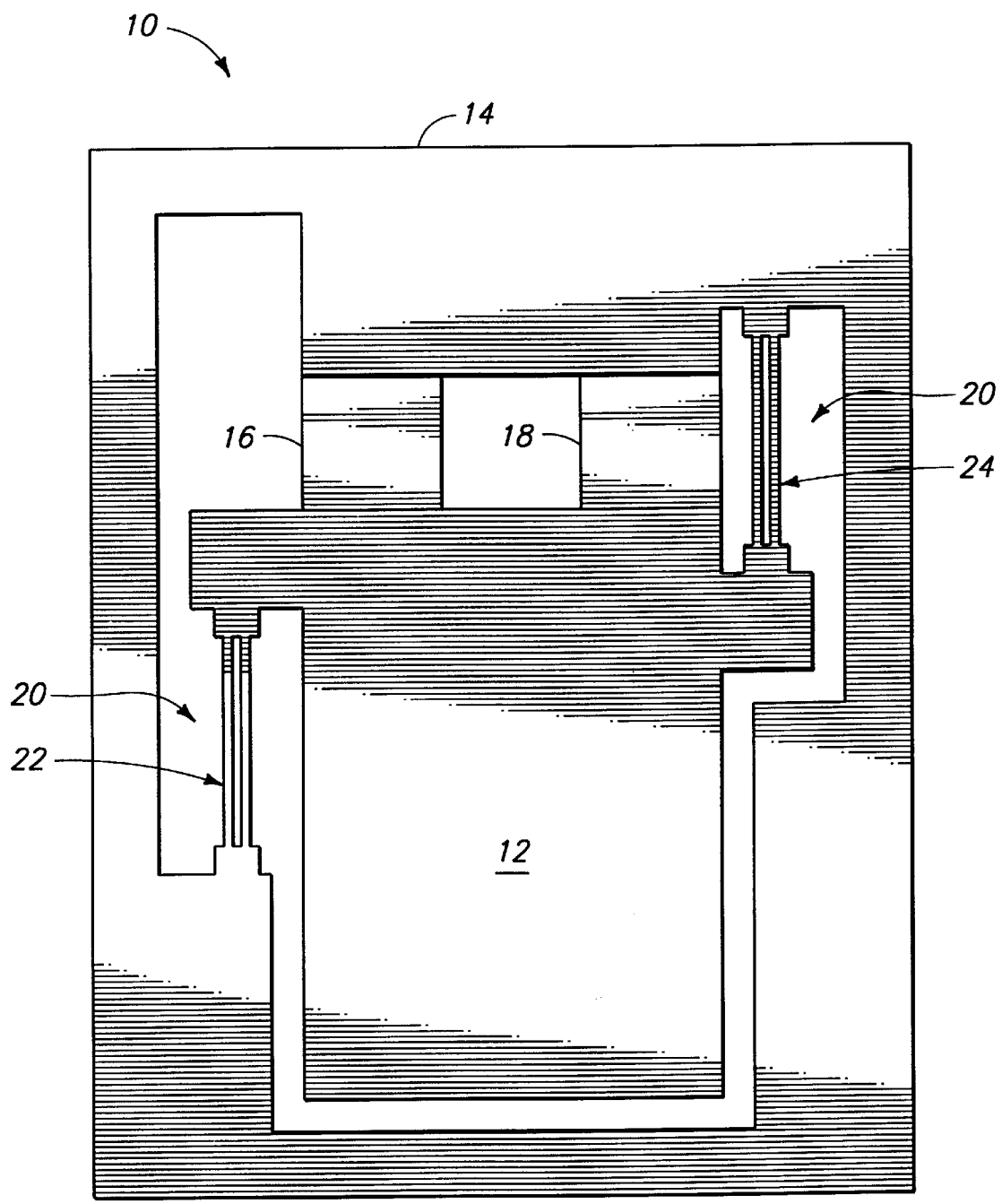
FIG. 1 is a schematic, top plan view of a known accelerometer.

FIG. 1 shows a force-sensing transducer in the form of an accelerometer generally at 10, which can be configured in accordance with various embodiments of the invention described below.

Accelerometer 10 is preferably formed from a single wafer of silicon through micromachining techniques. Accelerometers such as this and others are described in U.S. Pat. No. 5,005,413, the disclosure of which is incorporated by reference herein. Accelerometer 10 is configured as a force-sensing transducer which senses an acceleration force which acts upon the accelerometer. In this example, accelerometer 10 includes a movable member 12 in the form of a deflectable proof mass, which is supported upon a frame 14 by a pair of flexures 16, 18. A vibratable assembly 20 is provided and is coupled with and between movable member or proof mass 12 and frame 14. In this example, the movable member and the vibratable assembly comprise an integral material which is preferably crystalline, such as silicon. In a preferred embodiment, vibratable assembly 20 comprises a vibrating beam assembly which is configured to develop different vibratory frequencies responsive to movement or deflection of proof mass 12 in accordance with an acceleration applied thereto. The various frequencies at which the beams vibrate give an indication of the acceleration force acting upon the proof mass. The acceleration-sensing operation of accelerometer 10 is described in U.S. Pat. No. 5,379,639, the disclosure of which is incorporated by reference herein.

The illustrated and preferred vibrating beam assembly 20 includes first and second beam assemblies 22, 24 respectively, which are arranged into a push-pull configuration. Specifically, as proof mass 12 experiences an acceleration, it is moved or deflected along an input axis either generally into or out of the plane of the page upon which FIG. 1 appears. Such movement or deflection causes one of beam assemblies 22, 24 to go into compression, and the other of beam assemblies 22, 24 to go into tension. As this compression and tension occurs, the respective frequencies at which the beams vibrate change in a known and measurable manner. In this example, the frequency output comprises first and second frequencies $F_1$, $F_2$. The difference between these frequencies, e.g. $F_1-F_2$ gives a measure of the acceleration being experienced by the proof mass. Such is described in more detail in U.S. Pat. Nos. 5,379,639, and 5,005,413 incorporated by reference above.

Figure 2:
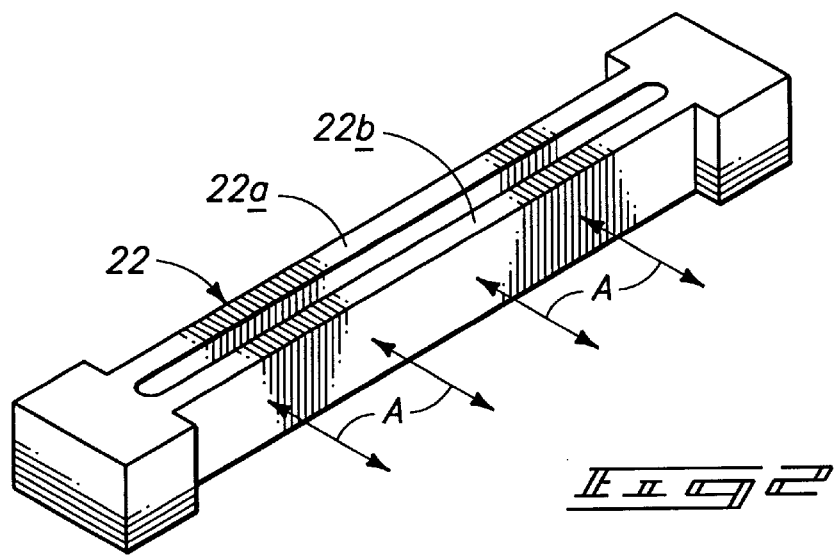
FIG. 2 is a perspective view of a vibratable assembly.
Figure 3:
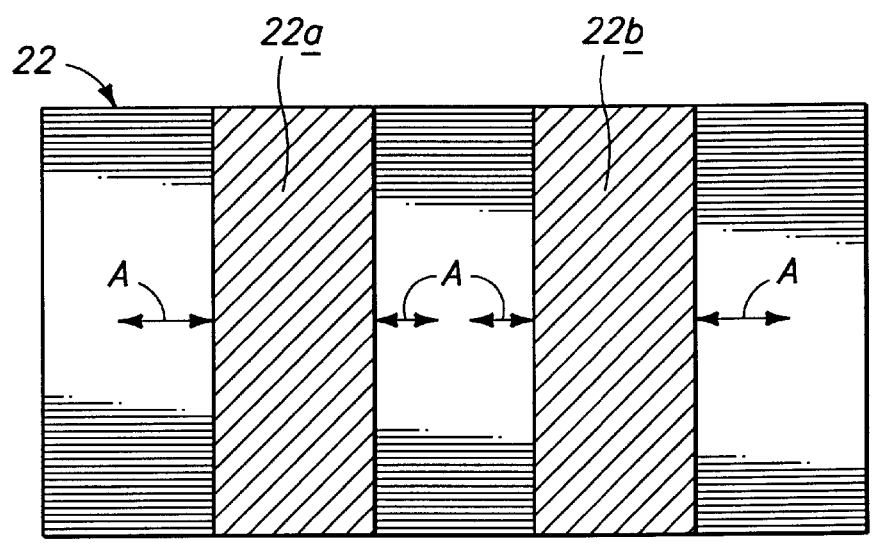
FIG. 3 is a combined sectional/elevational view of the FIG. 2 vibratable assembly.

First and second beam assemblies 22, 24 are sensitive to a number of effects which can change the frequency at which they vibrate. This frequency change, unless compensated for, can lead to errors in calculating acceleration. One such effect concerns the impact temperature has on the vibration frequencies. A solution to this problem is described in U.S. Pat. No. 5,379,639. Such solution includes using the common mode of the beam assemblies, e.g. $F_1+F_2$, to correct for, or compensate for temperature-induced errors. Another effect which can adversely impact the vibratory frequencies of the beam assemblies is that which is experienced due to pressure or density changes around the vibrating beam assemblies. Specifically, and as indicated above, when the pressure or density of the surrounding gas changes, the effective mass of the vibrating beams also change which, in turn, changes the beams' vibration frequencies. Specifically, FIGS. 2 and 3 show an exemplary beam assembly 22 with individual beams 22a, 22b isolated away from proof mass 12 and frame 14. Arrows A illustrate the mass loading effect on the beams, where gas molecules near the beams tend to oscillate with the beams thereby increasing their effective mass. When the density of the surrounding gas increases, the effective mass of the beam also increases which lowers the frequencies at which the beams vibrate.

FIG. 4 shows a schematic diagram illustrating a combined transducer or accelerometer and compensation processor in accordance with a preferred embodiment of the present invention. Like numbers from the above-described FIG. 1 embodiment have been utilized to describe similar features.

First beam assembly 22 forms part of a feedback loop for an oscillator 26 and determines the frequency $F_1$ of the oscillator. Similarly, second beam assembly 24 forms part of a feedback circuit for an oscillator 28 and determines the frequency $F_2$ of that oscillator. First and second beam assemblies 22, 24 are illustrated as double-ended tuning forks, but various other configurations of single and multiple tine vibratory members can be used.

The frequency outputs of oscillators 26, 28 are provided to a compensator or compensation processor 38 that provides a compensated acceleration signal on line 40. Various hardware, software, and/or firmware can be utilized to implement compensator processor 38 such as, for example, one that computes a corrected acceleration based on the values of the temperature signal derived from the common mode $F_1+F_2$, and the uncorrected acceleration signal, or a look-up table that has the corrected accelerations stored therein for various combinations of temperature and uncorrected acceleration.

In accordance with a preferred embodiment, a temperature sensor 42 is provided, and is configured to measure a temperature condition proximate vibratable assembly 20. The compensation processor is operably coupled with temperature sensor 42. The output of temperature sensor 42 is provided to compensation processor 38. The compensation processor 38 is preferably configured to enable computation or derivation of a more accurate, pressure-compensated acceleration. Additionally, the acceleration computed by the compensation processor can also preferably be temperature-compensated as described above.

While a suitable pressure sensor could be used to directly sense the pertinent pressures, a more preferred approach is to provide the temperature sensor described above and below. In one aspect, the temperature sensor is external to vibratable assembly 20 and provides a temperature output which is representative of a temperature condition proximate the vibratable assembly. The temperature sensor is preferably connected with the vibrating beam assembly and is configured to sense the temperature of, or proximate the vibrating beam assembly.

Specifically, Boyle's gas law provides a relationship between gas pressure and density as PV=nRT, where P is the gas pressure within the accelerometer's package, V is the gas volume within the package, n is the number of gas molecules within the package, R is a constant, and T is the gas temperature within the package. When the package volume is a constant and gas pressure and temperature are measurable, Boyle's gas law can be used to calculate n or the gas density within the sealed package. Thus, pressure measurement provides an indirect gas density measurement and the opportunity to track density-induced errors. The temperature sensor preferably provides the sensed temperature as an input to compensation processor 38 for suitable processing which includes deriving an acceleration which is both temperature- and pressure-compensated.

The basis upon which this system works is as follows. In this system, there are three unknowns to which the accelerometers are sensitive: acceleration or force, temperature, and pressure. Acceleration and temperature effects are calculable through the use of first and second frequencies $F_1$, $F_2$ as described above. The pressure effects, however, provide another unknown for which a solution must be found. Providing an independent temperature sensor provides a mechanism by which the accelerometer can be modeled over acceleration, temperature, and pressure to eliminate pressure effects from the desired acceleration measurement. Accordingly, the compensator or compensation processor is configured to compute an acceleration which is both temperature-compensated and pressure-compensated.

The compensation processor or compensator has frequency inputs $F_1$, $F_2$ for receiving the frequency output of vibratable assembly 20. Compensator 38 also has a temperature input $T_1$ for receiving the temperature output of temperature sensor 42. Preferably, the compensator is configured to compute, from the frequency output and the temperature output, a more accurate force measurement which compensates for the pressure condition proximate the vibratable assembly. Various aspects of the invention provide a solution to problems experienced in prior art transducers and accelerometers by providing modeling and reduction, if not elimination, of both temperature-driven and density-driven residual errors. In a preferred aspect, the present invention provides a three-dimensional contour model to compensate for density or pressure induced errors due to density or pressure changes within a sensor package. In a preferred aspect, regression techniques are utilized to formulate the contour surface model over dimensions of density, acceleration, and temperature, as a function of $F_1$, $F_2$, and a temperature sensor output as described above. The resultant model can be used to compensate the primary acceleration channel, e.g. $F_1$–$F_2$, for both density and temperature effects. In brief summary, the invention recognizes that if a temperature sensor is included as part of the accelerometer's package, then the three accelerometer outputs, e.g. $F_1$, $F_2$, and $T_1$, can be modeled as a function of three inputs, e.g. acceleration, temperature, and pressure. This three-function model can use standard linear regression methods. In practice, the accelerometer is tested over acceleration, temperature, and pressure and modeled.

In a reduction-to-practice example, an AD590 microcircuit, available from Analog Devices, Inc. of Norwood, Mass., was utilized to provide a measurement of the temperature for compensation processor 38. The temperature sensor was operably connected with the vibrating beam assembly by bonding a silicon strip temperature sensor to the stainless steel header closely proximate the silicon chip containing the accelerometer. Such temperature sensor can be, and preferably is mounted to sense a temperature condition inside a housing (indicated by dashed lines in FIG. 4) which contains the proof mass and vibrating beam assembly.

In use, aspects of the invention provide force-sensing methods which comprise using a pair of measured vibration frequencies and a measured temperature to compute or derive a temperature-compensated, pressure-compensated force experienced by a vibrating beam force sensor. In a preferred embodiment, a deflectable proof mass and a vibrating beam assembly coupled therewith are provided, and collectively configured to develop different vibratory frequencies responsive to an acceleration applied to the proof mass. The different vibratory frequencies are determined. An example of how such different vibratory frequencies are determined is given above. A temperature condition proximate the vibrating beam assembly is measured and, together with the determined vibratory frequencies, a pressure-compensated, temperature-compensated acceleration is computed or derived.

Advantages achieved by the invention can include pressure-compensation modeling capability at a reduced cost. Thus, accelerometer shelf life can be significantly increased. The costs involved to gain pressure sensitivity compensation according to the present invention is limited to the additional temperature sensor and any additional testing needed to model pressure for the unique sensor/packaging geometry employed. In addition, previous concerns associated with the integrity of the accelerometer's packaging insofar as hermiticity is concerned, are addressed by pressure-compensating the measured acceleration regardless of whether the accelerometer is hermitically sealed or not. Such can greatly facilitate assembly of the devices by removing design constraints directed to providing hermiticity.

The invention has been described in compliance with the applicable statutes. Variations and modifications will be readily apparent to those of skill in the art. It is therefore to be understood that the invention is not limited to the specific features shown and described, since the disclosure comprises preferred forms of putting the invention into effect. The invention is, therefore, to be interpreted in light of the appended claims appropriately interpreted in accordance with the doctrine of equivalents.

What is claimed is:

1. A pressure-compensated transducer comprising:
    a movable member;
    a vibratable assembly coupled with the movable member and configured to vibrate at various frequencies responsive to movement of the movable member, the assembly having a frequency output which gives an indication of the various frequencies, the various frequencies giving an indication of a force acting upon the movable member and giving an indication of the temperature at the movable member;
    a temperature sensor on the transducer configured to measure a temperature proximate the vibratable assembly and provide a second and independent temperature output; and
    a compensator coupled with the temperature sensor and having a temperature input for receiving the temperature output of the temperature sensor, the compensator being configured to compute, from the temperature output, a more accurate force measurement which compensates for a pressure condition proximate the assembly.

2. The pressure-compensated transducer of claim 1, wherein the compensator further comprises a frequency input for receiving the frequency output of the vibratable assembly, the compensator further being configured to compute, from the frequency output and the temperature output a more accurate force measurement which compensates for both the pressure condition proximate the vibratable assembly and a temperature condition of the assembly.

3. The pressure-compensated transducer of claim 2, wherein the frequency output comprises first and second frequencies.

4. The pressure-compensated transducer of claim 2, wherein the temperature sensor is mounted externally of the vibratable assembly.

5. The pressure-compensated transducer of claim 1, wherein the movable member and the vibratable assembly comprise an integral material.

6. The pressure-compensated transducer of claim 5, wherein the integral material is crystalline material.

7. A pressure-compensated accelerometer comprising:
    a deflectable proof mass;
    a vibrating beam assembly coupled with the proof mass and configured to develop different vibratory frequencies responsive to an acceleration applied to the proof mass member and giving an indication of the temperature at the assembly;

a temperature sensor configured to measure a second and independent temperature condition proximate the vibrating beam assembly; and a compensation processor operably coupled with the vibrating beam assembly and the temperature sensor and configured to enable computation of a more accurate, pressure-compensated, temperature-compensated acceleration as a function of the different vibratory frequencies and the temperature condition.

8. The pressure-compensated accelerometer of claim 7, wherein the temperature sensor is configured to sense the temperature of the vibrating beam assembly.

9. The pressure-compensated accelerometer of claim 7 further comprising a housing containing the proof mass and the vibrating beam assembly, and wherein the temperature sensor is configured to measure a temperature condition inside the housing.

10. The pressure-compensated accelerometer of claim 7, wherein the vibrating beam assembly comprises first and second beam assemblies arranged in a push-pull configuration.

11. The pressure-compensated accelerometer of claim 7, wherein the vibrating beam assembly comprises first and second beam assemblies arranged in a push-pull configuration, and the different vibratory frequencies comprise first and second frequencies.

12. The pressure-compensated accelerometer of claim 7, wherein the temperature sensor is configured to sense the temperature of the vibrating beam assembly, the vibrating beam assembly comprises first and second beam assemblies arranged in a push-pull configuration, and the different vibratory frequencies comprise first and second frequencies.

13. An acceleration-sensing method comprising:

providing a deflectable proof mass and a vibrating beam assembly coupled with the proof mass, the assembly and proof mass being collectively configured to develop different vibratory frequencies responsive to an acceleration applied to the proof mass and to the temperature at the assembly;

determining the different vibratory frequencies;

obtaining a second and independent temperature condition proximate the vibrating beam assembly; and using the determined vibratory frequencies and the independent temperature condition, deriving a pressure-compensated acceleration.

14. A force-sensing method comprising using a pair of measured vibration frequencies and a separate measured temperature sensed independently of said pair of frequencies to compute a temperature-compensated, pressure-compensated force experienced by a vibrating force sensor.

15. The force-sensing method of claim 14, wherein the force is an acceleration force.

16. A method of determining acceleration experienced by a vibrating-beam accelerometer with a plurality of vibrating beams comprising:

determining a first and second vibratory frequency;

determining a temperature condition proximate the vibrating beams of the accelerometer using an independent temperature sensor; and deriving from the first and second vibratory frequencies and the temperature condition, an acceleration which is both temperature-compensated and pressure-compensated.

17. The method of claim 16, wherein the derivation of the temperature-compensated and pressure-compensated acceleration comprises using linear regression techniques to model the frequency outputs and the temperature output to a unique set of acceleration, temperature, and pressure values.

18. The method of claim 16, wherein the determining of the temperature condition comprises mounting a temperature sensor proximate the vibrating beams which is configured to sense the temperature of the beams.

19. The method of claim 16, wherein the derivation of the temperature-compensated and pressure-compensated acceleration comprises using a three-dimensional contour surface map to model the frequency outputs and the temperature output to a unique set of acceleration, temperature, and pressure values.

* * * * *